Figure 1:
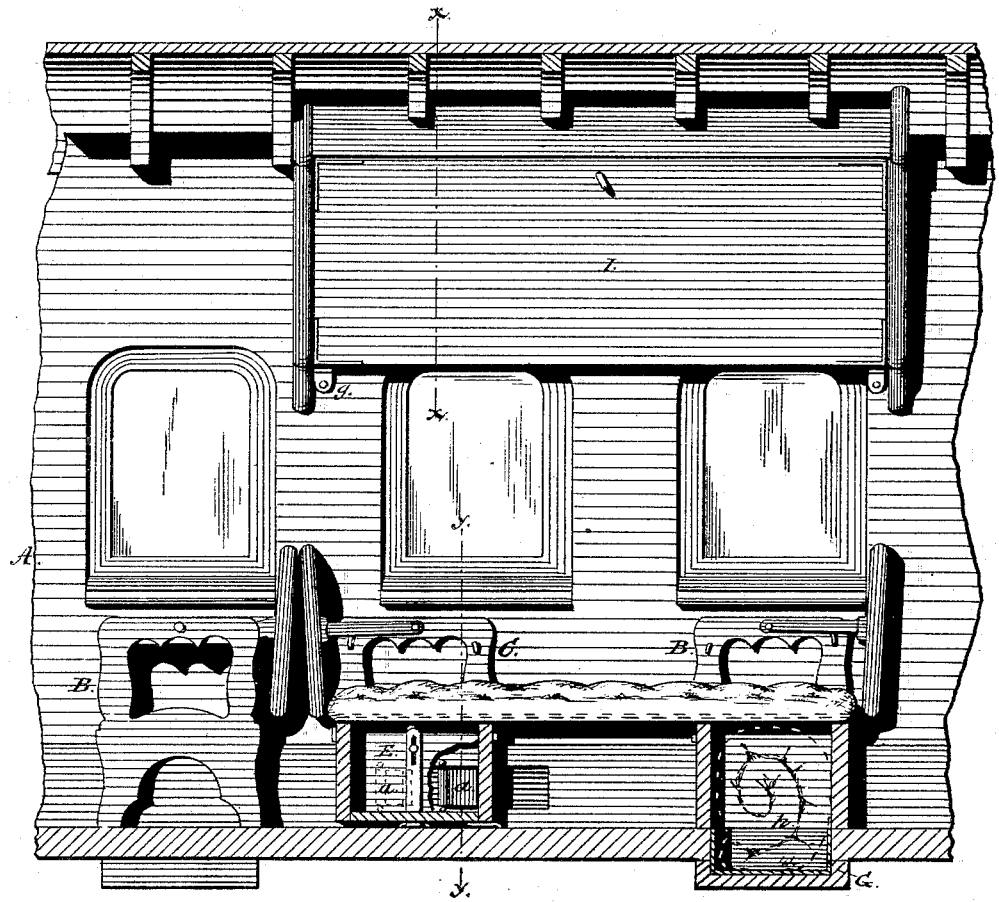

C. E. LUCAS.
Sleeping-Car Berth.

No. 159,195.

2 Sheets--Sheet 1.

Patented Jan. 26, 1875.

Witnesses;
Alonzo Hughes
D. P. Cowl

Inventor;
Christian E. Lucas
by Stansbury & Munn
his attys

2 Sheets--Sheet 2.
C. E. LUCAS.
Sleeping-Car Berth.
No. 159,195. Patented Jan. 26, 1875.
Fig. 2.
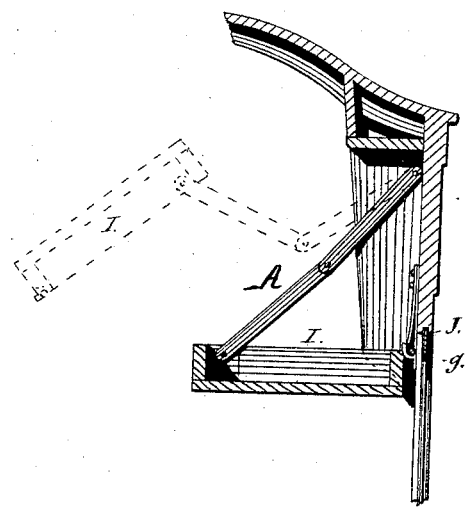
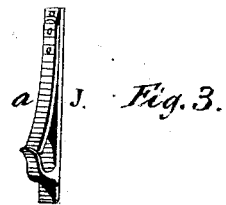
Fig. 3.
Witnesses:
Alonzo Hughes
D. P. Cowl
Inventor:
Christian E. Lucas
by Stansbury & Munn
his attys

UNITED STATES PATENT OFFICE.

CHRISTIAN E. LUCAS, OF ATLANTA, GEORGIA, ASSIGNOR OF ONE-HALF HIS RIGHT TO JOHN F. DIVINE, OF WILMINGTON, NORTH CAROLINA.

IMPROVEMENT IN SLEEPING-CAR BERTHS.

Specification forming part of Letters Patent No. 159,195, dated January 26, 1875; application filed December 30, 1874.

CASE B.

*To all whom it may concern:*

Be it known that I, CHRISTIAN E. LUCAS, of Atlanta, Fulton county, Georgia, have invented certain Improvements in Sleeping-Cars; and I do hereby declare the following to be a full and correct description of the same, reference being had to the accompanying drawings, in which—

Figure 1 is a side elevation of a portion of the interior of a sleeping-car, showing the upper berth folded or turned up. Fig. 2 is a cross-vertical section on the line $x\,x$ of Fig. 1, showing the upper berth let down, and also showing it, in dotted lines, detached at its rear side and turned bottom side up. Fig. 3 is a perspective view of a part detached.

As is well known, owing to the manner in which sleeping-car berths are hinged, it is inconvenient and difficult to thoroughly clean them.

The object of my invention is to obviate this difficulty by hinging them detachably, so that they may be easily and readily turned upside down, and all dirt or other matter be shaken out and removed.

In the drawings, I is an upper or hinged berth, shown folded up in Fig. 1, and let down in Fig. 2. The rear side of this berth is provided with suitable eyes $g$, which engage with spring or snap hooks J, attached to the side of the car, as shown in Fig. 2.

These hooks may be constructed in different forms, but the body should be strong, and the whole made substantially as shown in Fig. 3.

The front side of the berth is suspended by any suitable folding device, A, that will sustain it when down, and allow it to be swung up or outward when its rear side is detached.

The operation of detaching and turning the berth upside down will be readily understood. The tongues $a$ of the hooks are pressed back, and the eyes $g$ of the berth disengaged, when the berth can be thrown out bottom side up, as shown by the dotted lines in Fig. 2, and thoroughly cleaned of everything therein. It can then be swung back, hinged, folded, or turned and fastened in the ordinary way with a button or catch.

Having thus described my invention, what I claim is—

1. A sleeping-car berth, provided on its rear side with eyes $g$, in combination with spring or snap hooks J attached to the side of the car, substantially as and for the purpose set forth.

2. In a sleeping-car, a berth detachably connected at its rear side to the car, and supported at its front side, substantially as and for the purpose set forth.

The above specification of my said invention signed and witnessed at Washington this 19th day of December, A. D. 1874.

CHRISTIAN E. LUCAS.

Witnesses:
W. P. BELL,
CHAS. F. STANSBURY.